Patented Feb. 28, 1950

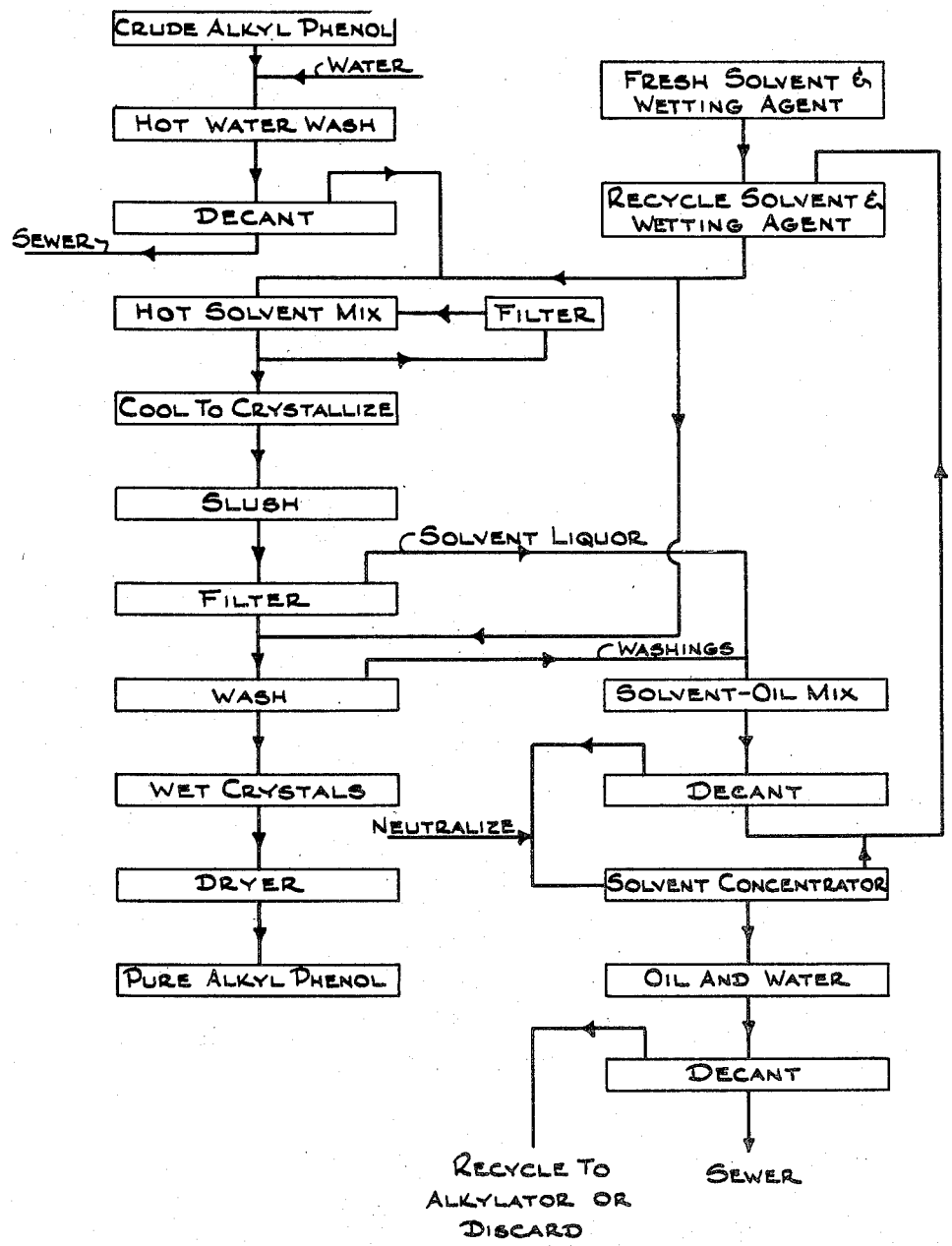

2,499,236

UNITED STATES PATENT OFFICE 2,499,236

PURIFICATION OF PHENOLS

Caril F. Van Gilder, Roselle, and Theodore J. Peters, Jr., Somerville, N. J., assignors to Standard Oil Development Company, a corporation of Delaware Application December 3, 1947, Serial No. 789,392

4 Claims. (Cl. 260—624)

This invention relates to the isolation and purification of crystalline alkylated phenols from crude mixtures of these phenols and relates more particularly to the purification of polyalkyl phenols, such as 4-methyl-2, 6-di-tertiary butyl phenol.

One of the conventional methods of isolating and purifying such phenols is by distillation, more particularly vacuum distillation. Such methods of purification require removal of residual catalyst from the crude phenols before subjecting them to heat because of the extreme reversibility of the alkylation reaction at high temperatures. The crude alkyl phenols readily revert to phenol in presence of catalysts at high temperature. In order to remove the catalyst, i. e. sulfuric acid, it is necessary to submit the crude product to extensive washing with caustic to hydrolyze the sulfuric acid-olefin and phenol complexes. Frequently high temperature, pressure washing is also required. Further, since the hydrolysis of these complexes is never quite complete, it is necessary to distill the crude in an alkaline condition which results in caustic build-up in the vacuum still with subsequent heat transfer loss, necessitating shutdowns for clean outs, etc. Products resulting from distillation contain appreciable amounts of undesirable contaminants, such as other phenols and particularly mono-alkyl phenols lower boiling than the desired pure compound, ranging from 3-10%, depending on efficiency of fractionation. The desired compounds are therefore highly discolored in most cases. This discoloration is due to oxidation and the occlusion of polymeric products resulting from high temperatures and metallic surface contact.

An improved method for isolating and obtaining a pure crystalline alkylated phenol is discussed in copending U. S. application for patent, Serial No. 674,256, filed on June 4, 1946, now Patent No. 2,493,781. It is disclosed therein that an aqueous organic solvent which has only a limited solvent action on the desired alkylated phenol can be ideally adapted for use in a crystallization process for purifying the beforesaid phenol.

In that process, the crude alkylated material is treated with an aqueous organic solvent of a closely controlled concentration, i. e., approximately 60% isopropyl alcohol, so that a 2 liquid phase system is developed. The upper layer, or oil phase, contains the dissolved alkylated phenol and the lower layer, or water phase, contains water soluble contaminants. The alkylated phenol is then crystallized from the oil layer.

One of the limitations of the latter process has been the difficulty in recovering maximum yields of crystalline products. The crystals frequently contain occlusions of the oily by-products. The subsequent recrystallization necessary to obtain the desired purity tends to diminish the yields because of the loss due to the solubility in the crystallization media.

It has now been found that a process utilizing a small amount of a wetting agent in conjunction with the before mentioned aqueous organic solvent results in increased yields of purer crystalline products.

It is believed that the reason for the accomplishment of this invention lies in the fact that the wetting agent preferentially decreases the interfacial tension between the crystals of the alkylated phenols and the aqueous organic solvent. Thus the occlusion of contaminants is inhibited as the crystals grow in size. A purer, whiter product is thereby obtained.

This invention will be better understood by reference to the annexed general flow plan Figure 1.

Crude alkylated phenols are charged to a suitable vessel and washed with hot water to reduce the free acidity. After separation of the water layer, a solution of 60% by volume of aqueous isopropyl alcohol and 1-3% of a wetting agent is added to decanted oil layer and the mixture is agitated while hot. A two-phase liquid system results with the alcohol distributed between the bottom water layer and the top phenol oil layer. Any solid foreign material present at this stage is removed by a filter. The entire liquid phase is then cooled until crystallization takes place.

By judicious control of the cooling rate and degree of agitation, any desired crystal size can be attained. For example, 5-7 hours' cooling with 5-24 R. P. M. stirring gives crystals the size of sugar crystals. The crystals are isolated from the slush by filtration or centrifuging and are washed with dilute solvent to remove adhering mother liquor. The wetting agent may also be incorporated here, but preferably is not used. The crystals are dried to the finished product.

The washings are combined with solvent liquor from the slush filter, and the solvent mixture is settled to give two layers. The bottom layer, after fortification with concentrated alcohol to 60% and the wetting agent up to the desired strength is passed directly to recycle with no further purification. The top phenol-alcohol layer is neutralized with aqueous carbonate and sent to a still (solvent concentrator) in which alcohol is completely recovered and returned to recycle. The still residue, after separation from the aqueous layer, can be recycled back for further alkylation. The wetting agent concentration found here is negligible.

An example of the procedure follows:

100 pounds of melted crude alkylated phenol (2,6 di-tert. butyl, 4-methyl phenol) are charged to an open vessel equipped with a variable speed agitator and a steam and water coil. 20 to 40 gallons of hot water are added and the mixture agitated 15 minutes at 60°–70° C. After settling for 10–15 minutes, the water is drawn off the bottom and discarded. Another wash is desirable but not necessary. To the molten washed, crude alkylated phenol are added 29.4 gallons of 60% (vol.) isopropyl alcohol and 0.6 gallon of a long chain alcohol sulfate.

The mixture is agitated at 50° C. minimum. At this point two phases are evident. After a very short period of mixing, water is turned into the coil to cool the mass to crystallize. The rate of agitation and rate of cooling can be adjusted to give any desired crystal size, from extremely fine up to ¼" or larger. Crystallization generally starts at 47–45° C. Cooling to this incipient crystallization temperature can be rapid. After some crystal formation, the cooling rate should be reduced to obtain the best yields. A preferred time is 5–24 hours. After the mixture has crystallized, the mass is sent through a continuous filter or centrifuge and the crystals isolated. The crystals are washed free of entrained liquor with fresh 60% alcohol (6–10 gallons) and dried to the finished product.

The residual mother liquor, consisting of the two phases, is combined with the wash liquors and the whole sent to a settler. The bottom alcohol layer (50% alcohol concentration) with some dissolved oil is fortified with fresh or recovered alcohol to 60% and wetting agent to 2% of the overall volume and recycled directly to the crystallizer with no further treatment. The top layer is sent to a still, sufficient carbonate added to neutralize free acidity, and the alcohol recovered by a simple distillation. Total alcohol recovery is possible, yielding 70% strength alcohol. The still residues, consisting of incompletely alkylated material and water are settled, the water layer discarded, and the phenols recycled back to the alkylation equipment. In this manner 95% of alkylated phenol is recoverable, based on p-cresol charged.

Data are shown in the attached example of the effect of adding varying amounts of mixed long chain alcohol sulfates, i. e. $C_{12}$—$C_{18}$, on the yield and color of the product. 100 grams of crude alkylated product was treated with 150 cc. of 60% isopropyl alcohol and varying amounts of a wetting agent.

TABLE

Effect of wetting agent on recovery of 4-methyl 2,6 tertiary butyl phenol from 60% isopropyl alcohol solution

| Percent Wetting Agent on Alcohol | Percent Yield 4-Methyl 2,6 Tertiary Butyl Phenol | Color of Product |
|---|---|---|
| 0 | 72 | Yellow-white. |
| 0.5 | 73 | Do. |
| 1.0 | 76.2 | Slight yellow-white. |
| 1.5 | 77.5 | White. |
| [1] 2.0 | 78.4 | Do. |

[1] Practically theoretical recovery.

Other conventional water soluble wetting agents and their sodium salts may be used, such as other sulfated alcohols, sulfonated amide and ester derivatives, alkyl aryl sulfates, alkyl aryl ether sulfates, esters of polyhydroxy alcohols, petroleum sulfonates, etc.

Other alcohols, such as methyl and ethyl, may be used in place of 60% isopropyl. The degree of dilution varies somewhat with the alcohol but the preferred ranges are 80% methyl, 75% ethyl.

The above method of purification can be applied with modifications to the isolation of other crystalline phenols which have only limited solubility in aqueous organic solvents by proper adjustment of quantity and strength of solvent. Such phenols are p-tert. butyl phenol, and p-isooctyl phenol. The alcohol strength must be adjusted to give the proper phase distribution, the preferred range in these cases being 30% to 40%.

One of the advantages of this invention lies in the higher yields obtained. Another advantage is that up to 80% of the organic solvent and a substantial proportion of the wetting agent can be recycled without any purification treatment. Another advantage is the high purity and water-white color of the alkylated phenol obtained. Still another advantage resides in the decrease in number of recrystallizations necessary to obtain the desired pure product.

What is claimed is:

1. In the method of isolating and purifying a crystalline alkylated phenol from an acidic crude mixture of the alkylated phenol wherein an acidic catalyst has been employed, which comprises washing the crude mixture with water, agitating the thus washed crude mixture with an aqueous alcohol solution in which the alkylated phenol has slight solubility at 50° C., so as to form a mass of two distinct liquid phases, cooling the resultant mass of said aqueous alcohol solution with said washed crude mixture until the mass becomes a slush containing crystals of the alkylated phenol, and separating said crystals from the remaining liquids, the improvement which comprises adding 1 to 3% by volume of $C_{12}$ to $C_{18}$ long chain alcohol sulfates to the aqueous alcohol solution which is agitated with said washed crude mixture prior to said cooling.

2. The method of isolating and purifying a crystalline polyalkylated phenol in an incompletely alkylated phenol oil of a crude acid mixture which comprises adding to said phenol oil a composition consisting of an aqueous alcohol solution of approximately 60 volume percent isopropyl alcohol with 1–3% by volume of $C_{12}$ to $C_{18}$ long chain alcohol sulfates, said composition containing sufficient water to form two liquid phases with the phenol oil, an oil phase and an aqueous phase at 50° C., the alcohol being in both phases, cooling said liquid phases together until polyalkylated phenol crystals are deposited therefrom, and separating the polyalkylated phenol crystals from said liquid phases for washing and drying.

3. Process as in claim 2 including the additional step, subsequent to the crystallization and removal of the polyalkylated phenol crystals, of separating the remaining oil phase, which contains some of the alcohol, from the aqueous phase, removing alcohol from the incompletely alkylated phenol in the thus separated oil phase, and employing the alcohol for further isolation of polyalkylated phenol from incompletely alkylated phenol.

4. A method as in claim 2 in which the crystalline polyalkylated phenol is 4-methyl 2,6 di-tertiary butyl phenol and the aqueous alcohol solution is an isopropyl alcohol solution.

CARLL F. VAN GILDER.
THEODORE J. PETERS, Jr.

REFERENCES CITED

The following references are of record in the file of this patent:

UNITED STATES PATENTS

| Number | Name | Date |
|---|---|---|
| 1,968,794 | Bertsch | July 31, 1934 |
| 2,265,582 | Stevens et al. | Dec. 9, 1941 |
| 2,370,554 | Luten, Jr., et al. | Feb. 27, 1945 |
| 2,395,857 | Foster et al. | Mar. 5, 1946 |